United States Patent [19]
Deering

[11] Patent Number: 6,115,047
[45] Date of Patent: Sep. 5, 2000

[54] METHOD AND APPARATUS FOR IMPLEMENTING EFFICIENT FLOATING POINT Z-BUFFERING

[75] Inventor: Michael F. Deering, Los Altos, Calif.

[73] Assignee: Sun Microsystems, Inc., Palo Alto, Calif.

[21] Appl. No.: 09/040,921

[22] Filed: Mar. 18, 1998

Related U.S. Application Data

[63] Continuation-in-part of application No. 08/673,117, Jul. 1, 1996.

[51] Int. Cl.$^7$ ........................................................ G06F 17/16
[52] U.S. Cl. ............................ 345/422; 345/419; 345/421
[58] Field of Search ................................. 345/419, 422, 345/421

[56] References Cited

U.S. PATENT DOCUMENTS

| | | | |
|---|---|---|---|
| 3,621,214 | 11/1971 | Romney et al. | 345/421 |
| 4,470,122 | 9/1984 | Sarr | 364/559 |
| 4,679,041 | 7/1987 | Fetter et al. | 345/139 |

(List continued on next page.)

FOREIGN PATENT DOCUMENTS

| | | | |
|---|---|---|---|
| 6 656 609 | 6/1995 | European Pat. Off. | G06T 15/10 |
| 2 219 470 | 12/1989 | United Kingdom | G06F 15/72 |
| 2 271 259 | 4/1994 | United Kingdom | G06F 15/72 |

OTHER PUBLICATIONS

Foley, James D. and others. "Computer Graphics: Principles and Practice" 2d (Reading: Addison–Wesley, 1990) pp. 237–283, Jan. 1990.

Blinn, "A Trip Down the Graphics Pipeline: The Homogeneous Perspective Transform," *IEEE Computer Graphics and Applications*, 13(3): 75–80, May 1993.

Foley, et al., "Computer Graphics: Principles and Practice," 2d ed., (Reading Addison–Wesley) pp. 204, 208–222, 229–231, 234–235, 238–242, 254–255, 267, 270, 279, 501 and 809.

IEEE–754 Binary Floating–Point Arithmetic (READ), IEEE Standards, revised 1998, pp. 1–18.

*Primary Examiner*—James P. Trammell
*Assistant Examiner*—John Leonard Young
*Attorney, Agent, or Firm*—Conley, Rose & Tayon, P.C.; Jeffrey C. Hood

[57] ABSTRACT

A method for handling Z-values in accordance with the present invention. The Z-values correspond to vertices of a given primitive being processed within a graphics pipeline. The Z-values received by the pipeline are represented in a first floating point format (such as IEEE floating point format) which includes a mantissa portion and an exponent portion. The method comprises determining which of the Z-values for the given primitive has the largest value of the exponent portion. In one embodiment, this includes comparing current exponent values to a current greatest exponent value until all Z-values are tested. The method subsequently comprises generating a common Z exponent value in response to determining the largest exponent value for the given primitive. In one embodiment, the common Z exponent value is generated by subtracting a constant value from the largest exponent value. The method next comprises converting the Z-values of the given primitive to a fixed point format in which the mantissa portion is scaled to the common Z exponent value. The converted values are then forwarded with the primitive as graphics processing continues with a first set of operations which utilize the Z-values (represented in the fixed point format) and the common Z exponent value. Since it is likely the Z exponents for the given primitive are closely related, the Z-values may be represented with a single exponent value. After this first set of operations, the Z-values are converted back to a second floating point format. A second set of graphics operations (namely, hidden surface removal) is then performed using this second floating point format. By using the common Z exponent and the intermediate fixed point format for representation, Z-values of the given primitive are more efficiently handled throughout the rendering pipeline.

28 Claims, 13 Drawing Sheets

U.S. PATENT DOCUMENTS

| | | | |
|---|---|---|---|
| 4,800,515 | 1/1989 | Hori et al. | 364/746.1 |
| 4,862,392 | 8/1989 | Steiner | 345/427 |
| 4,985,834 | 1/1991 | Cline et al. | 345/424 |
| 4,987,554 | 1/1991 | Kaufman | 345/424 |
| 4,991,131 | 2/1991 | Yeh et al. | 364/748 |
| 5,084,830 | 1/1992 | Doornink et al. | 345/516 |
| 5,103,418 | 4/1992 | Birger | 364/715.04 |
| 5,109,480 | 4/1992 | Sone et al. | 345/431 |
| 5,163,127 | 11/1992 | Ikumi et al. | 345/426 |
| 5,230,039 | 7/1993 | Grossman et al. | 345/430 |
| 5,287,436 | 2/1994 | Fischer et al. | 345/419 |
| 5,293,467 | 3/1994 | Buchner et al. | 345/422 |
| 5,392,393 | 2/1995 | Deering | 345/505 |
| 5,428,716 | 6/1995 | Brokenshire et al. | 345/421 |
| 5,438,527 | 8/1995 | Feldbaumer et al. | 364/578 |
| 5,440,682 | 8/1995 | Deering | 345/503 |
| 5,444,838 | 8/1995 | Kommrusch et al. | 345/441 |
| 5,457,779 | 10/1995 | Harrell | 345/502 |
| 5,493,644 | 2/1996 | Thayer et al. | 345/502 |
| 5,499,324 | 3/1996 | Nakayama | 345/429 |
| 5,508,948 | 4/1996 | Hatta | 364/715.03 |
| 5,572,634 | 11/1996 | Duluk, Jr. | 345/419 |
| 5,596,686 | 1/1997 | Duluk, Jr. | 345/422 |
| 5,613,050 | 3/1997 | Hochmuth et al. | 345/422 |
| 5,673,374 | 9/1997 | Sakaibara et al. | 345/426 |
| 5,748,863 | 5/1998 | Fossum | 345/422 |
| 5,819,017 | 10/1998 | Akeley et al. | 345/422 |
| 5,856,829 | 1/1999 | Gray, III et al. | 345/422 |
| 5,870,097 | 2/1999 | Snyder et al. | 345/426 |
| 5,872,902 | 2/1999 | Kuchkuda et al. | 345/430 |

Computer

METHOD AND APPARATUS FOR IMPLEMENTING EFFICIENT FLOATING POINT Z-BUFFERING

CONTINUATION DATA

This application is a continuation-in-part of U.S. application Ser. No. 08/673,117, filed Jul. 1, 1996, by Michael F. Deering, entitled "Method And Apparatus Implementing High Resolution Rendition of Z-Buffered Primitives", and assigned to the assignee of this application.

FIELD OF THE INVENTION

The present invention relates to 3-D graphics, and more particularly to handling of Z-buffer values within the processing pipeline of a 3-D graphics accelerator.

DESCRIPTION OF THE RELATED ART

Modem three-dimensional computer graphics techniques use geometry extensively to describe three-dimensional objects. Complex smooth surfaces of objects to be displayed may be represented using high level abstractions. Detailed surface geometry may be rendered using texture maps, although providing more realism requires raw geometry, usually in the form of triangle primitives. In modem workstation computer systems, position, color (e.g., red, blue, green and optionally $\alpha$), and normal components of these triangles are typically represented as floating point numbers. The treatise *Computer Graphics: Principles and Practice* (2nd ed.), by Foley, van Dam et al. provides substantial detail as to three-dimensional graphics in general and should be consulted by those wishing further background information.

FIG. 1 depicts a prior art graphics system 10 such as may be used within a computer system to display user-generated images. As shown, graphics system 10 receives graphics input data from a CPU 20 via a system bus 22. The graphics input data includes commands and data which represent triangle primitives used to render three-dimensional objects on display device 30. Graphics system 10 typically includes a graphics accelerator unit 14, a frame buffer random access memory unit 16 (which may be implemented using 3DRAM or other forms of memory), and a video control unit 18. Processed video from graphics system 10 is then conveyed to monitor 30, which displays images such as 40 and 50.

Within the context of the invention to be described, displayed objects 40 and 50 typically will have a three-dimensional surface, and commonly a portion of one object may be hidden by a portion of another object. In FIG. 1, for example, a portion of object 40 appears to be in front of a portion of object 50, thus hiding from view the concealed portion of object 50. The portion of object 50 that is hidden from view by another object is termed a hidden surface.

The realism achieved in rendering three-dimensional objects depends upon many factors, including rapidly calculating those portions of objects that are visible and those portions that are hidden (e.g., have hidden surfaces). Graphics accelerators such as unit 14 thus perform hidden surface removal of each object to be displayed. A Z-buffer unit 12 associated with graphics accelerator unit 10 stores a "Z-value", e.g., a depth-value, for each pixel that is to be rendered. Because more than one object may map to a given pixel, Z-buffer unit 12 is used in order to ensure that objects that are far away from the view point are projected behind objects that are closer to the view point. A Z-value for a pixel of object 50, for example, should only be written to Z-buffer 12 when the Z value is closer to the viewing position than the Z-value that is already stored for that screen location. In practice, the old Z-value for the current pixel being rendered is read from the Z-buffer and is numerically compared with a newly generated Z-buffer value for the current pixel. Depending upon the outcome of the comparison, the old Z-values and color frame buffer pixel values will remain, or will be replaced by the newly calculated values. This concept is commonly referred to as "Z-buffering".

When graphics input data is received by graphics accelerator 14, geometry data (i.e., coordinates) are converted from model coordinates to view clipping coordinates through a transformation matrix. The resultant clipping coordinates are "homogeneous", meaning that they include a "W" coordinate in addition to the normal Cartesian coordinates. The W coordinate indicates a scaled distance along the z-axis from the viewpoint to the transformed point. The Z coordinate refers to a similar scaled distance, but one having its origin other than at the viewpoint (typically an origin at the front clipping plane, or a point between the front and back clipping planes). After perspective division, the new value of Z (Z') is derived from the quantity Z/W, where Z and W represent coordinate values prior to perspective division. For orthographic projection (in which objects do not diminish in size with increasing distance from the viewpoint), the value Z' for a given point is directly proportional to the distance to the point in world coordinates. Early three-dimensional computer graphics systems were most concerned with this type of projection. In these applications, numeric representation of Z-values using either fixed point or floating point math were well-suited to the numeric values produced by the math.

But as three-dimensional computer graphics adopted perspective projection (in which objects diminish in size with increasing distance from the viewpoint), the underlying historically developed equations and numeric representations were not changed, even though such numerical representations were no longer well matched to the mathematics involved. For example, in perspective projection, the value Z' for a given point is directly proportional to the reciprocal of the distance to point in world coordinates. The equations used in the prior art produced a screen space (transformed) Z-value related to the world space distance as follows:

$$Z = \left(\frac{1}{1-\frac{F}{B}}\right) \cdot \left(1 - \frac{F}{Z}\right) \tag{1}$$

where F represents the distance in world coordinates to the front clipping plane, and B represents the distance to the back clipping plane in world coordinates. Note that equation (1) is defined such that points near front clipping plane F have a value near zero, while points near back clipping plane B have a value near one. (Using a slightly different equation, Z-values approach 1 and −1, or −1 and 1, at the front and back clipping planes).

When B is much greater than F, equation (1) reduces to $$Z \approx 1 - \frac{F}{Z}. \tag{1'}$$

The B/F ratio plays an important role in Z-buffering. In the early days of perspective projection graphics, the B/F ratio was typically a small integer. Commonly, the front clipping plane would be two feet from the viewpoint, and the back clipping plane would be four to ten feet away. This configuration was sufficient to view three-dimensional objects having an apparent size of a few feet.

However, more modem and realistic large scale virtual environments may dictate that the front clipping plane is but a few inches from the viewer's nose, while the back clipping plane is miles away. For this configuration, very large B/F ratios result. For example, a front clipping plane at six inches and a rear clipping plane at ten miles produces a B/F ratio exceeding 100,000. Even smaller ranges of six inches and six hundred feet can still produce ratios exceeding 1,000.

In typical prior art Z-buffers, large B/F ratios produce problems with numerical accuracy in representing Z-values. Consider the particular case of B/F=1,024. In screen space, using equation (1), any points located in the back half of this range (more than halfway toward the back clipping plane) will have ten leading one digits before any other distance-representing bits begin, e.g., a form .111111111 xxx . . . xxx. Thus in world coordinates, any points requiring n bits of accuracy to represent a value between B/2 and B, will require 10+n bits of accuracy for screen space representation, if equation (1) is used. In general, equation (1) requires approximately the ceiling($\log_2$(B/F)) additional bits for screen space representation. For example, a B/F ratio of 100,000 will require an additional 17 bits. Note that the above representation loss affects both fixed point and floating point representations. While floating point representations are efficient at encoding values having leading zero bits, because the screen space Z values of points near the back clipping plane are mapped to one, the extra bits generated are leading one bits.

Consider another example in which front clipping plane F is located 5 cm from the viewpoint, while back clipping plane B is located 100,000 cm (1 km) from the viewpoint. Using a traditional fixed point format to represent these Z-buffer values results in a huge disparity of discrete steps at the front and back clipping planes. In one embodiment, a 24-bit fixed point Z-buffer has 2,796,324 steps in the first cm, with only 94 steps in the last 10,000 cm (106.4 cm/step). While using a floating point (28-bit) representation in another embodiment is an improvement (44,741,478 steps in the first cm; 1490 steps in the last 10,000 cm), there is still a need for additional accuracy with large F/B ratios.

The use of prior art numeric representations for Z-values may result in visual artifacts. When Z-buffered data is properly calculated, images 40 and 50 will be displayed as shown in FIG. 1, where the apple 40 is in front of the box 50. FIG. 2A depicts the proper projected image representation for these two images. However, in a Z/F distance regime in which Z-buffered data becomes too inaccurate, errors can occur. Thus, in FIG. 2B, rather than overwrite underlying pixel data for the concealed surface of box 50, prior art Z-buffer unit 12 has erroneously decided to simultaneously paint pixels for object 40 and for object 50. This "Z-buffer fighting" results in an undesirable overlay region. FIG. 2C shows yet another type of display error resulting from incorrect Z-buffering. In FIG. 2C, a portion of box 50 erroneously appears solidly in front of a portion of apple 40.

The resolution loss problems described above are particularly dependent upon the B/F ratio. Assume that the ratio of B/F is M, that is the front clipping plane is at distance F and the back clipping plane is at distance MF. Consider now that the distance to the back clipping plane is doubled (i.e., the back clipping plane is now at distance 2MF). For each such distance doubling, another bit of resolution is lost, leaving potentially too few bits to resolve the remaining distances in the far half of the Z-buffer, e.g., between MF and 2MF. Assuming a Z-representation of n bits maximum, points at distance between 1F and 2F will be represented with n-1 bits of accuracy. Points between 2F and 4F will be represented with at most n-2 bits of accuracy, etc. Thus the bits remaining may be insufficient to adequately resolve distances between obscuring objects, giving rise to incorrect calculation and display of hidden surfaces.

This concept is illustrated in FIG. 2D. The front and back clipping planes are denoted as F and B, respectively. At the left of FIG. 2D, the "0" represents the viewpoint; that is, the eye of the viewer observing the representations of the displayed objects. Objects 40 and 50 shown in FIG. 1 are also depicted in FIG. 2D.

The applicant's above-referenced parent patent application provides a Z-buffering method and apparatus that does not suffer from the numerical accuracy problems that prior art systems exhibit. The Z-values disclosed in the parent application are calculated by a different equation than equation (1), and are represented in floating point. This Z-buffering advantageously does not impose a non-linear loss of bits on objects rendered at distant ranges.

Applying this new floating point representation to the entire graphics pipeline, however, is expensive, requiring dedicated floating point hardware. Since the additional accuracy is not used in a great portion of the rendering pipeline, the benefits of the new Z-buffer representation are potentially outweighed by the drawbacks.

It would thus be desirable to obtain the benefits of the floating point Z-buffer representation disclosed in the parent patent application while minimizing additional hardware requirements.

SUMMARY OF THE INVENTION

The problems outlined above are in large part solved by a method for handling Z-values in accordance with the present invention. The Z-values correspond to vertices of a given primitive being processed within a graphics pipeline. The Z-values received by the pipeline are represented in a first floating point format (such as IEEE floating point format) which includes a mantissa portion and an exponent portion. The method comprises determining which of the Z-values for the given primitive has a largest value of the exponent portion. In one embodiment, this includes comparing current exponent values to a current greatest exponent value until all Z-values are tested. The method subsequently comprises generating a common Z exponent value in response to determining the largest exponent value for the given primitive. In one embodiment, the common Z exponent value is generated by subtracting a constant value from the largest exponent value. The method next comprises converting the Z-values of the given primitive to a fixed point format in which the mantissa portion is scaled to the common Z exponent value. The converted values are then forwarded with the primitive as graphics processing continues with a first set of operations which utilize the Z-values (represented in the fixed point format) and the common Z exponent value. After this first set of operations, the Z-values are converted back to a second floating point format. A second set of graphics operations (namely, hidden surface removal) is then performed using this second floating point format.

By using a single exponent for all vertices of the given primitive, the Z-values may be represented more efficiently, resulting in increased performance for the graphics pipeline. Efficiency is further increased by using an intermediate fixed point format, which is more compact than the equivalent floating point format. Finally, in one embodiment, the Z-values are represented using the formula $W_f/W$. Unlike prior art systems, this representation does not impose a non-linear loss of bits for points at distant ranges with large F/B ratios.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE EMBODIMENTS

Figure 1:
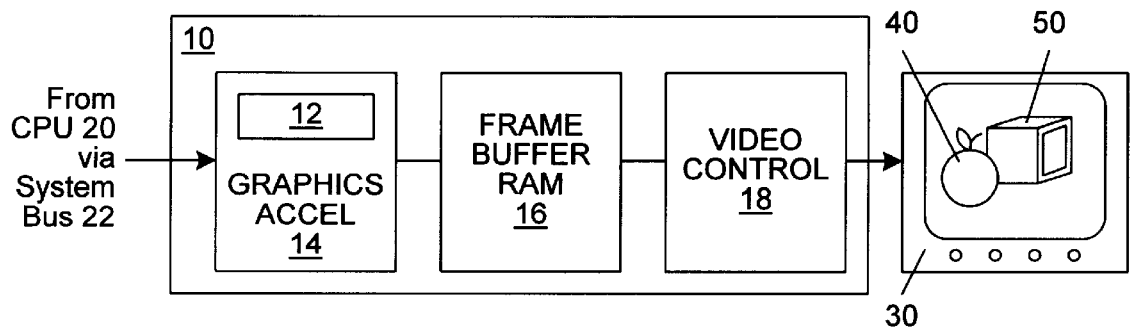
FIG. 1 depicts Z-buffering in a prior art graphics processing system.
Figure 2A:
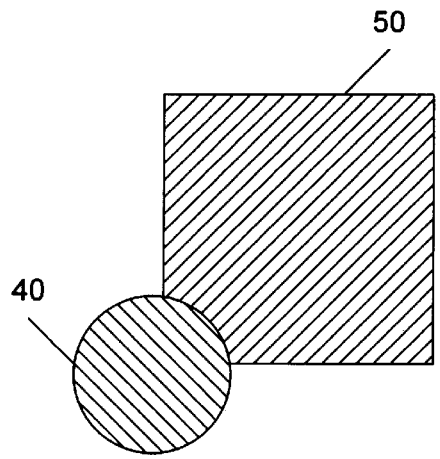
FIG. 2A depicts a representation of three-dimensional objects in which hidden surface removal has been performed correctly.
Figure 2B:
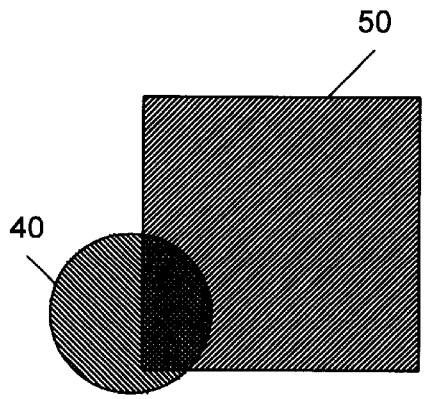
FIGS. 2B–2C depict representations of three-dimensional objects in which hidden surface removal has been performed incorrectly.
Figure 2C:
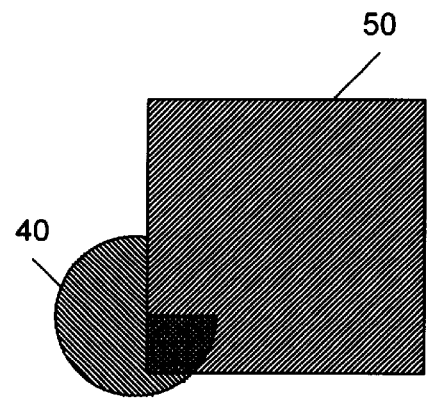
Figure 2D:
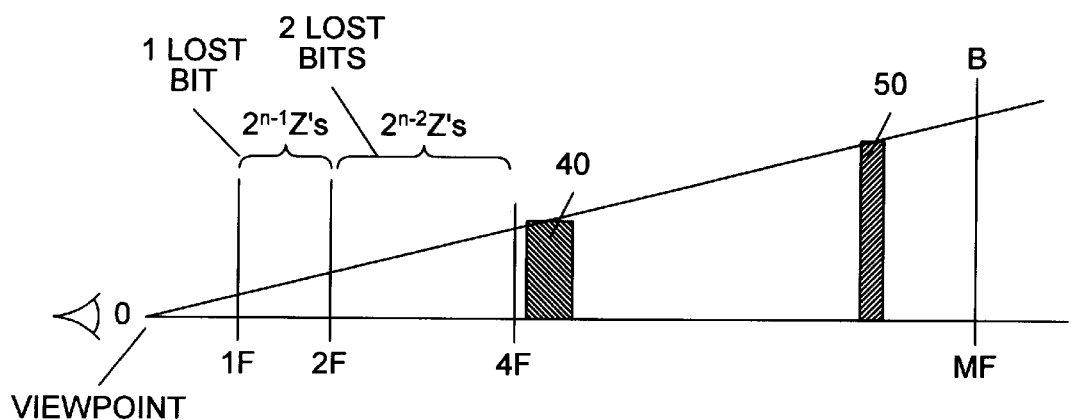
FIG. 2D depicts the loss of accuracy that results from prior art numeric representations for Z-values.
Figure 3:
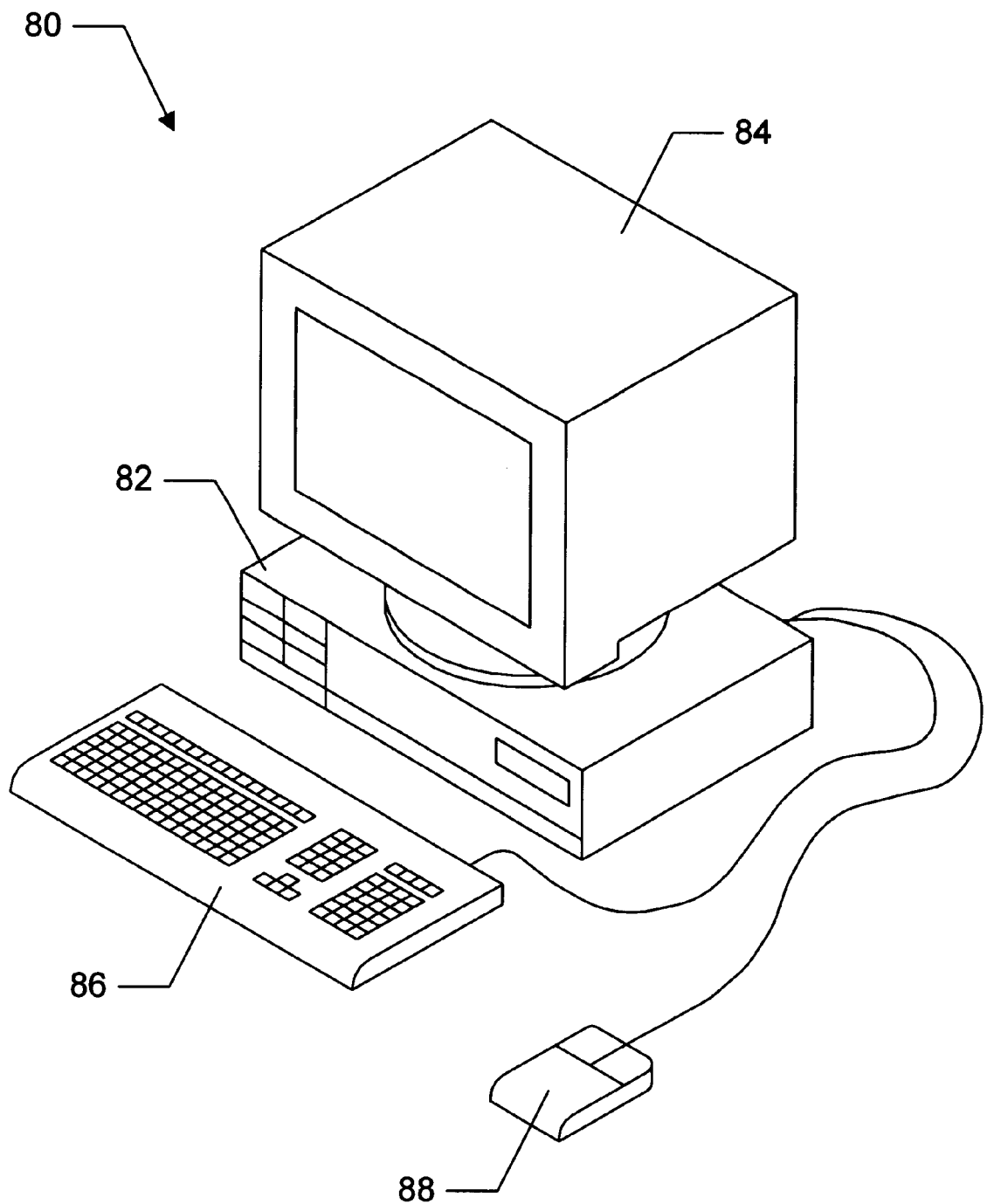
FIG. 3 illustrates a computer system which includes a three dimensional (3-D) graphics accelerator according to the present invention.

FIG. 3—Computer System

Referring now to FIG. 3, a computer system 80 which includes a three-dimensional (3-D) graphics accelerator according to the present invention is shown. As shown, the computer system 80 comprises a system unit 82 and a video monitor or display device 84 coupled to the system unit 82. The display device 84 may be any of various types of display monitors or devices. Various input devices may be connected to the computer system, including a keyboard 86 and/or a mouse 88, or other input. Application software may be executed by the computer system 80 to display 3-D graphical objects on the video monitor 84. As described further below, the 3-D graphics accelerator in computer system 80 includes improved capabilities for handling Z-values of geometry data which correspond to primitives used to render three-dimensional graphical objects on display device 84.

Figure 4:
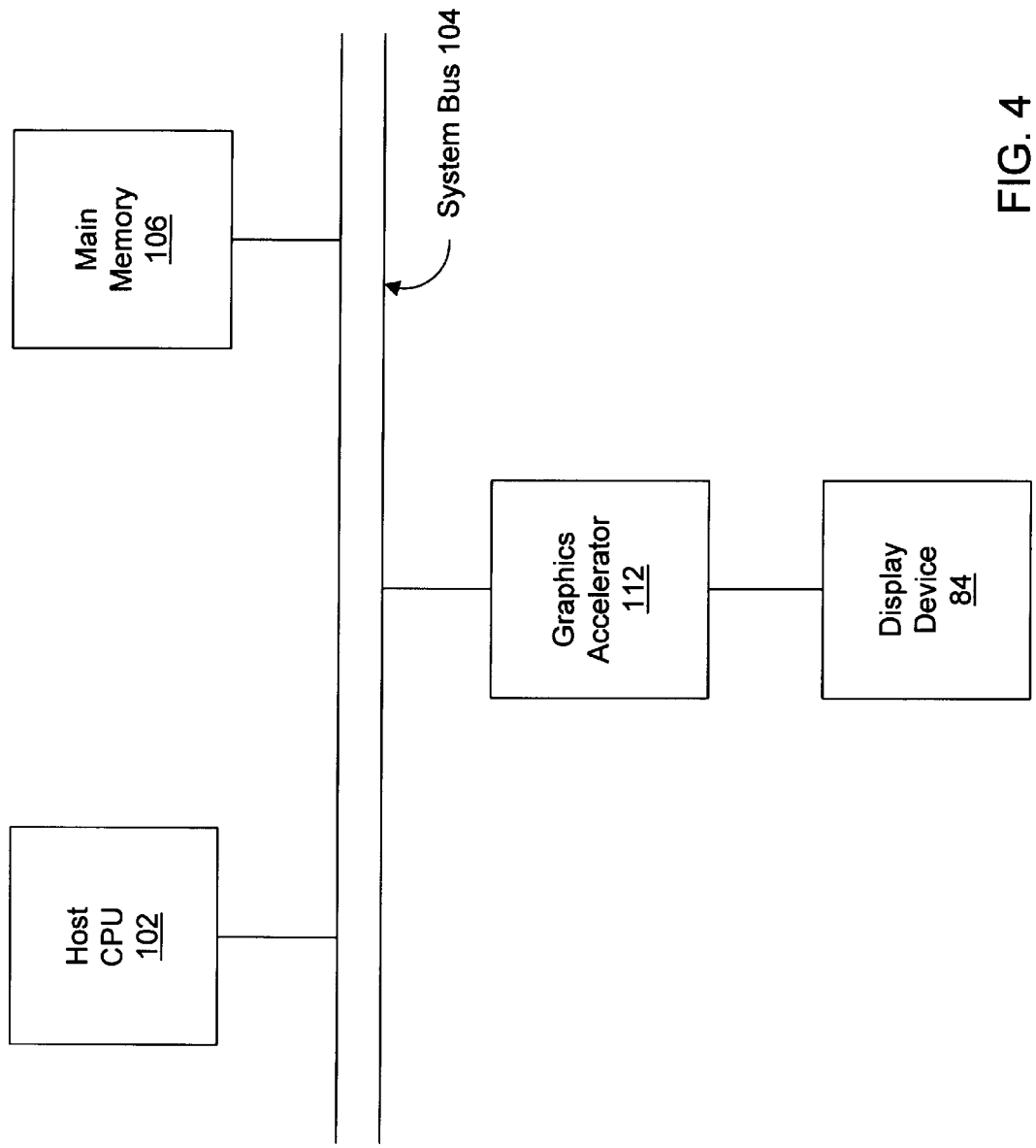
FIG. 4 is a simplified block diagram of the computer system of FIG. 3.

FIG. 4—Computer System Block Diagram

Referring now to FIG. 4, a simplified block diagram illustrating the computer system of FIG. 3 is shown. Elements of the computer system which are not necessary for an understanding of the present invention are not shown for convenience. As shown, the computer system 80 includes a central processing unit (CPU) 102 coupled to a high speed bus or system bus 104. A system memory 106 is also preferably coupled to the high speed bus 104.

The host processor 102 may be any of various types of computer processors, multi-processors and CPUs. The system memory 106 may be any of various types of memory subsystems, including random access memories and mass storage devices. The system bus or host bus 104 may be any of various types of communication or host computer buses for communication between host processors, CPUs, and memory subsystems, as well as specialized subsystems. In the preferred embodiment, the host bus 104 is the UPA bus, which is a 64 bit bus operating at 83 MHz.

A 3-D graphics accelerator 112 according to the present invention is coupled to the high speed memory bus 104. The 3-D graphics accelerator 112 may be coupled to the bus 104 by, for example, a cross bar switch or other bus connectivity logic. It is assumed that various other peripheral devices, or other buses, may be connected to the high speed memory bus 104, as is well known in the art. It is noted that the 3-D graphics accelerator may be coupled to any of various buses, as desired. As shown, the video monitor or display device 84 connects to the 3-D graphics accelerator 112. Graphics accelerator 112 is described in more detail below.

Figure 5:
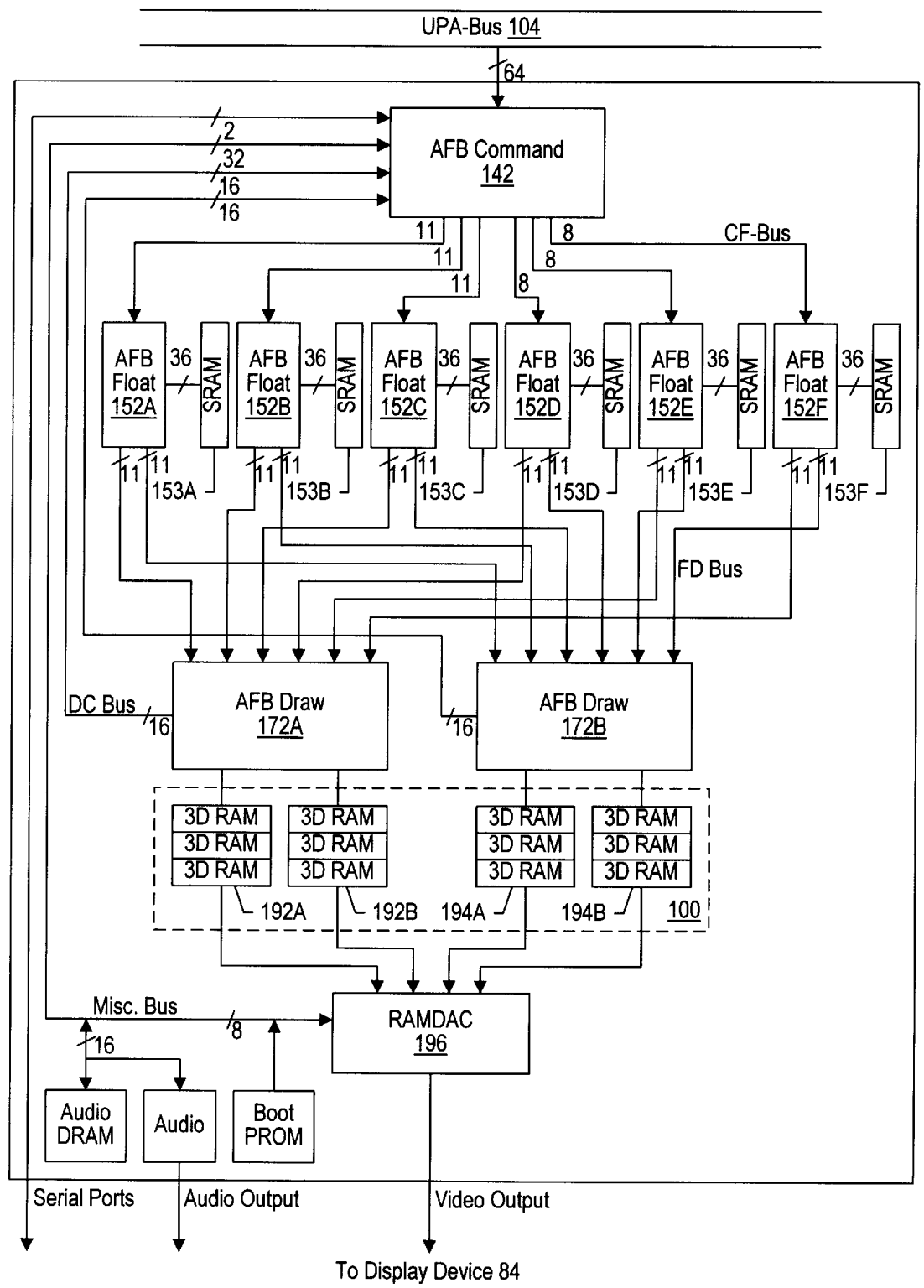
FIG. 5 is a block diagram illustrating the 3-D graphics accelerator according to the preferred embodiment of the present invention.

FIG. 5—Graphics Accelerator

Referring now to FIG. 3, a block diagram is shown illustrating the graphics accelerator 112 according to the preferred embodiment of the present invention. As shown, the graphics accelerator 112 is principally comprised of a command block 142, a set of floating-point processors 152A–152F, a set of draw processors 172A and 172B, a frame buffer 100 comprised of 3DRAM, and a random access memory/digital-to-analog converter (RAMDAC) 196.

As shown, the graphics accelerator 112 includes command block 142 which interfaces to the memory bus 104. The command block 142 interfaces the graphics accelerator 112 to the host bus 104 and controls the transfer of data between other blocks or chips in the graphics accelerator 112. The command block 142 also pre-processes triangle and vector data and performs geometry data decompression.

The command block 142 interfaces to a plurality of floating point blocks 152. The graphics accelerator 112 preferably includes up to six floating point processors labeled 152A–152F, as shown. The floating point processors 152A–152F receive high level drawing commands and generate graphics primitives, such as triangles, lines, etc. for rendering three-dimensional objects on the screen. The floating point processors 152A–152F perform transformation, clipping, face determination, lighting and set-up operations on received geometry data. Each of the floating point processors 152A–152F connects to a respective memory 153A–153F. The memories 153A–153F are preferably 32 k×36-bit SRAM and are used for microcode and data storage.

Each of the floating point blocks 152A–F connects to each of two draw processors 172A and 172B. The graphics accelerator 112 preferably includes two draw processors 172A and 172B, although a greater or lesser number may be used. The draw processors 172A and 172B perform screen space rendering of the various graphics primitives and operate to sequence or fill the completed pixels into the 3DRAM array. The draw processors 172A and 172B also function as 3DRAM control chips for the frame buffer 100. The draw processors 172A and 172B concurrently render an image into the frame buffer 100 according to a draw packet received from one of the floating-point processors 152A–152F, or according to a direct port packet received from the command processor 142.

Each of the floating point blocks 152A–F preferably operates to broadcast the same data to the two drawing blocks 172A and 172B. In other words, the same data is always on both sets of data lines coming from each floating point block 152. Thus, when the floating point block 152A transfers data, the floating point block 152A transfers the same data over both parts of the FD-bus to the draw processors 172A and 172B.

Each of the respective drawing blocks 172A and 172B couple to frame buffer 100, wherein frame buffer 100 comprises four banks of 3DRAM memory 192A–B, and 194A–B. The draw processor 172A couples to the two 3DRAM banks 192A and 192B, and the draw processor 172B couples to the two 3DRAM banks 194A and 194B, respectively. Each bank comprises three 3DRAM chips, as shown. The 3DRAM memories or banks 192A–B and 194A–B collectively form the frame buffer 100, which is 1280×1024 by 96 bits deep. The frame buffer stores pixels corresponding to 3-D objects which are rendered by the draw processors 172A and 172B.

Each of the 3DRAM memories 192A–B and 194A–B couple to a RAMDAC (random access memory digital-to-analog converter) 196. The RAMDAC 196 comprises a programmable video timing generator and programmable pixel clock synthesizer, along with cross-bar functions, as well as traditional color look-up tables and triple video DAC circuits. The RAMDAC in turn couples to the video monitor 84.

The command block is preferably implemented as a single chip. Each of the floating point processors 152 are preferably implemented as separate chips. In the preferred embodiment, up to six floating point blocks or chips 152A–F may be included. Each of the drawing blocks or processors 172A and 172B also preferably comprise separate chips.

Figure 6:
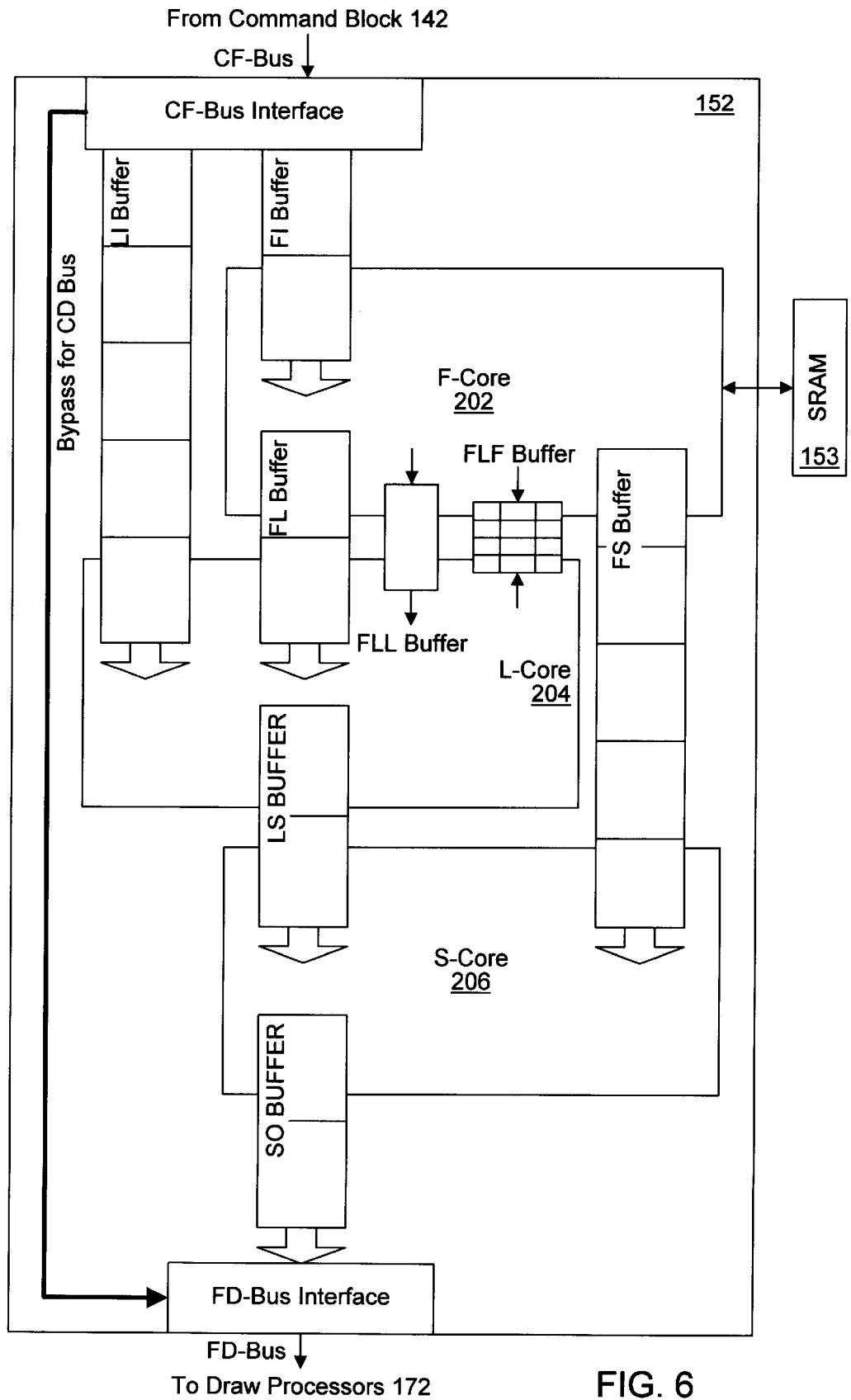
FIG. 6 is a block diagram illustrating one of the floating point processors in the 3-D graphics accelerator in the preferred embodiment of the present invention.

FIG. 6—Floating Point Processor Block Diagram

Referring now to FIG. 6, a block diagram illustrating one of the floating point processors 152 according to the preferred embodiment of the present invention is shown. Each of the respective floating point processors 152A–152F are identical, and thus only one is described here for convenience. As shown, each of the floating point blocks 152 includes three main functional units or core processors, these being F-core 202, L-core 204, and S-core 206. The F-core block 202 is coupled to receive data from the CF-bus transferred from the Command block 142. The F-core block 202 provides output data to each of the L-core block 204 and the S-core block 206. The L-core block 204 also provides data to the S-core block 206. The S-core block 206 provides output data to the FD bus.

The F-core block 202 performs all floating point intensive operations, including geometry transformation, clip testing, face determination, perspective division, and screen space conversion. The F-core block 202 also performs clipping when required. In the preferred embodiment, the F-core block 202 is fully programmable, using a 36-bit micro instruction word stored in a 32 k word SRAM (153).

The L-core block 204 performs most lighting calculations using on-chip RAM-based microcode. Unlike prior art lighting units, L-core block 204 uses fixed point arithmetic to effect these calculations. In the preferred embodiment, the numeric range of L-core block 204 is −2.0 to +2.0, using a s1.14 format (one sign bit, one integer bit, and fourteen fractional bits). The majority of lighting calculations may be performed within this range using these type of 16-bit operands. Some parameters needed for lighting calculations, however, exceed this range, and are handled as described below.

The L-core block 204 also includes an efficient triple-word design for more efficient lighting calculations. This triple-word design operates with a 48-bit data word comprising 16-bit fixed point values. Thus one instruction can perform the same function on all three color components (RGB) or all three components of a normal ($N_x$, $N_y$, and $N_z$) in one cycle. The math units comprised in the L-core block 204 automatically clamp values to the allowed numeric range, thus requiring no additional branches.

The S-core block performs setup calculations for all primitives. These set-up calculations involve computing the distances in multiple dimensions from one vertex to another and calculating slopes along that edge. For triangles, the slopes of the Z depth, the color, and the UV (for texture) are also computed in the direction of a scan line.

Figure 7:
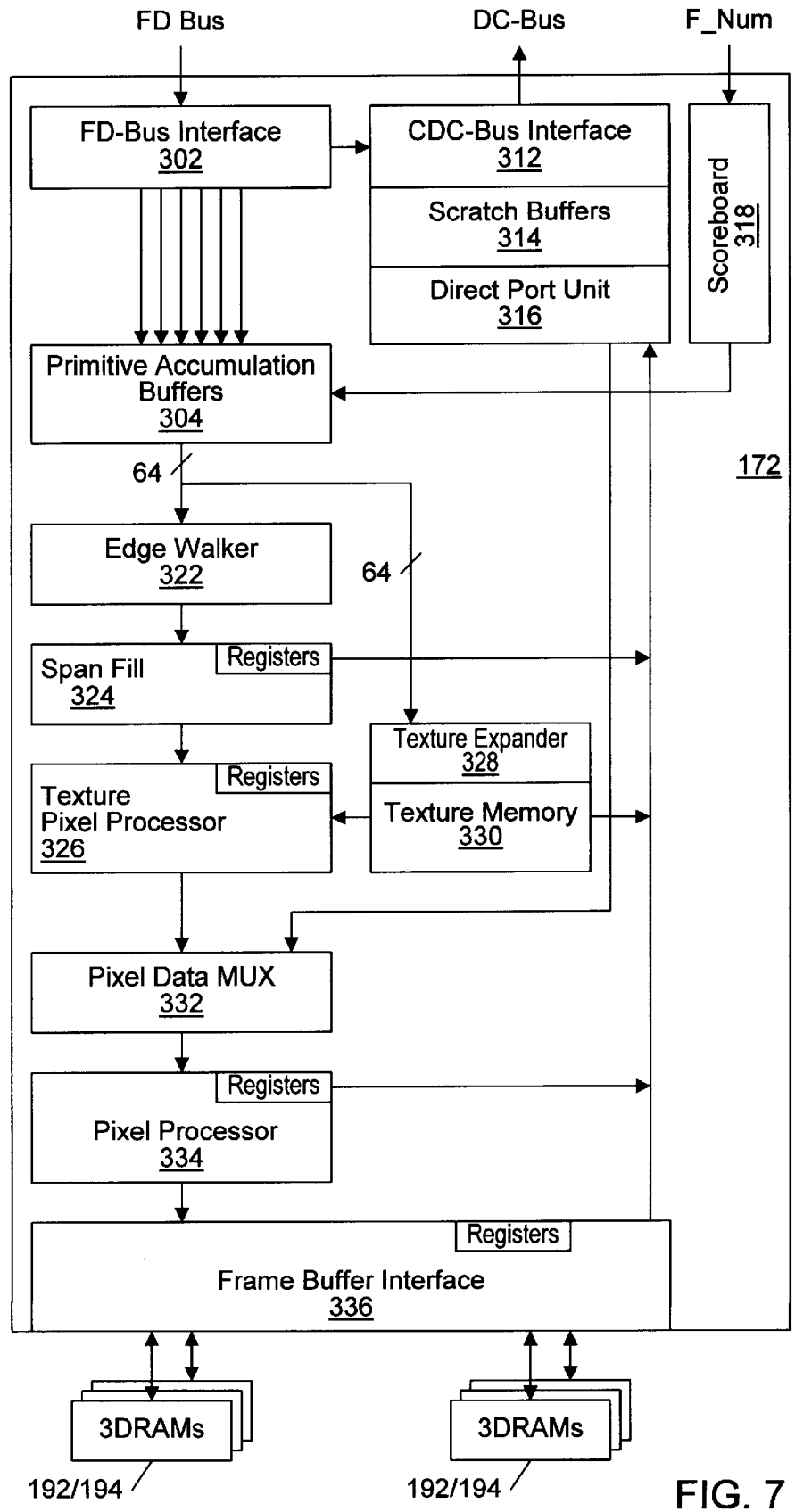
FIG. 7 is a block diagram illustrating one of the draw processors in the 3-D graphics accelerator in one embodiment of the present invention.

FIG. 7—Draw Processor Block Diagram

Referring now to FIG. 7, a block diagram illustrating draw processor 172A is shown. Each of draw processors 172A and 172B are identical, and thus only one is described here for convenience. The draw processor 172 manages the sequencing of the 3DRAM chips. Each draw processor 172 comprises 3DRAM scheduling logic for both internal pixel caches and video output refresh. These resources are controlled by queuing up rendered pixels before they reach the 3DRAM and snooping the pixel addresses in this queue to predict 3DRAM cache misses.

As shown, each draw processor 172 includes an FD bus interface block 302 for interfacing to the FD bus. The FD bus interface block 302 couples to CDC bus interface logic 312. The CDC bus interface logic 312 couples to scratch buffers 314 and a direct port unit 316. The direct port unit 316 receives input from frame buffer interface logic 336 and provides an output to pixel data mux logic 332. The CDC bus interface logic 312 also couples to provide output data to the DC bus. The FD bus interface 302 provides outputs to primitive accumulation buffers 304.

The draw processor 172 also includes scoreboard 318 which keeps track of primitive ordering as specified by the command processor 142. As shown, the scoreboard logic receives an F_Num input and provides an output to the primitive accumulation buffers 304. The command block 142 provides a 3-bit code to the draw processor 172 every time a (unicast) primitive is copied into one of the CF-bus output FIFOs. The code specifies which of the six floating point block processors 152A–152F receives the primitive. The code also includes a bit which indicates whether the primitive is ordered or unordered. All ordered primitives are required to come out in the order that they were put in. Unordered primitives may be taken from the primitive accumulation buffers 304 whenever they become available. Some primitives, such as text and markers, output multiple primitives for each primitive input, and these primitives are preferably placed in unordered mode for efficiency.

However, all attributes sent to the draw processor 172 must remain ordered relative to primitives they might modify. In addition, there are cases with lines and triangles where strict ordering must also be preserved. The scoreboard logic 318 keeps track of at least 64 primitives. The scoreboard logic 318 provides a signal back to the command block 142 when the scoreboard logic 318 is close to being full, in order to prevent overflowing the scoreboard buffer 318.

As mentioned above, the primitive accumulation buffers 304 receive outputs from the FD-bus interface 302 and from the scoreboard logic 318. The primitive accumulation buffers 304 provide an output to edge walker logic 322 which in turn provides an output to span fill logic 324. The span fill logic 324 provides an output to a texture pixel processor 326. The span fill logic 324 also provides an output to the direct port unit 316. The primitive accumulation buffers 304 also provide an output to texture expander logic 328. The texture expander logic 328 couples to texture memory cache 330. The texture memory cache 330 provides data to the texture pixel processor 326. The texture memory cache 330 also provides data to the direct port unit 316. The texture pixel processor 326 and the direct port unit 316 each provide data to the pixel data multiplexer 332. The pixel data multiplexer 332 provides its output to a pixel processor 334. The pixel processor 334 provides its output to the frame buffer interface 336, and also provides output to the direct port unit 316.

The primitive accumulation buffers 304 are used to accumulate primitive data until a complete primitive has been received. Thus, as data is collected from the six floating point processors 152A–152F, the data eventually forms complete primitives. The primitive accumulation buffers 304 include enough room to hold one complete primitive, plus sufficient storage to hold a portion of a second primitive to maintain the pipeline flowing smoothly. The six primitive accumulation buffers 304 are filled as data comes in from each of the six floating point processors 152A–152F. As soon as the primitive has been fully received, in general the next one will be coming behind it. Thus, the primitive accumulation buffers 304 include sufficient extra buffering to transfer the completed primitive out of the primitive accumulation buffer 304 to the edge walker logic 322 before the data gets full from the data coming in from the next primitive. In the preferred embodiment, the primitive accumulation buffers 304 are several words larger than the largest primitive (triangle) that will be processed. The primitive accumulation buffers 304 provide a 64-bit output to the edge walker logic 322. The primitives are removed from the primitive accumulation buffers 304 one at a time based on the contents of the scoreboard logic 318.

The edge walker logic 322 partitions primitives into pieces that may easily be handled by the span fill unit 324. For triangles, the edge walker logic 322 walks along the two current edges and generates a pair of vertical spans adjusted to the nearest pixel sample point, which are then sent to the span fill unit 324. The edge walker unit 322 also performs similar adjustment for lines, sending a line description to the span field unit 324 that is very similar to a triangle span. The edge walker logic 322 comprises two 16×24 multipliers used to perform these adjustments. The edge walker logic 322 further includes several adders which keep track of counts used to make other computations. Primitives other than triangles and lines are split up depending on the most efficient use of resources. Both jaggy and anti-aliased dots are sent straight through the logic with a minimum of adjustments, such as adding 0.5 to jaggy dots. Big dots are provided through the edge walker logic 322 as individual pixels. The edge walker logic 322 converts polygons and rectangles to horizontal spans. The edge walker logic 322 does not modify Bresenham lines in any way before being sent onto the span fill unit 324.

The span fill unit 324 performs an interpolation of values across arbitrarily oriented spans, usually for triangles and lines, and also performs filter weight table look ups for anti-aliased lines. For optimized primitives, including triangle span pairs, rectangle and polygon spans, and anti-aliased lines and dots, two pixels are generated per cycle. All other primitives generate one pixel per cycle. The final stage of the span fill unit 324 also performs dithering, converting 12-bit colors to 8-bit values using a 4×4 screen space dither pattern. The span fill logic 324 provides output to the texture pixel processor 326.

The texture pixel processor 326 performs texture calculations and controls the look up of texels in the texture memory cache 330. The texture pixel processor 326 produces a color to be merged in to the pixel by the pixel processor 334. The texture pixel processor 326 passes data onto pixel data multiplexer 332 for all other primitives except for textured triangles.

As mentioned above, the primitive accumulation buffers 304 provide an output to the texture expander 328. The texture expander 328 operates to expand received textures for storage in the texture memory cache 330. The texture memory cache 330 is thus loaded directly from the primitive accumulation buffers 304 and is connected to the texture pixel processor for texel look-ups. The texture memory cache 330 is designed to hold enough data to texture map a 16×16 texel region, including all of the smaller mipmaps. The texture memory cache 330 is preferably double-buffered so than one buffer can be loaded while the current buffer is in use. It is noted that the 16×16 texel region is actually stored as a 17×17 array to enable the interpolation to operate correctly.

As mentioned above, the pixel data multiplexer 332 receives input data from the texture pixel processor 326 and the direct port unit 316. The pixel data mux logic 332 arbitrates between pixels coming from the span fill unit 324 and those coming from the CD bus. Pixels from the CD bus are always given priority. The pixel data multiplexer 332 provides its output to the pixel processor 334.

The pixel processor 334 performs blending, anti-aliasing, depth cueing and set up for logical operations in the 3DRAM 192 and 194. The pixel processor 334 also comprises logic which is operable to prevent a pixel write for operations such as line patterning, stencil patterning, V port clipping, and so forth. The pixel processor 334 provides an output to the frame buffer interface 336.

The frame buffer interface 336 comprises logic necessary to read and write pixels from the 3DRAM memories 192A–B. The frame buffer interface 336 manages the level 1 (L1) and level 2 (L2) caches in the 3DRAM chips. This is performed by looking ahead to the pixels to be written and paging in the needed cache while other pixel accesses are occurring. The frame buffer interface 336 in turn couples to 3DRAM memories 192/194 as shown.

Handling of Z-Values

Figure 8:
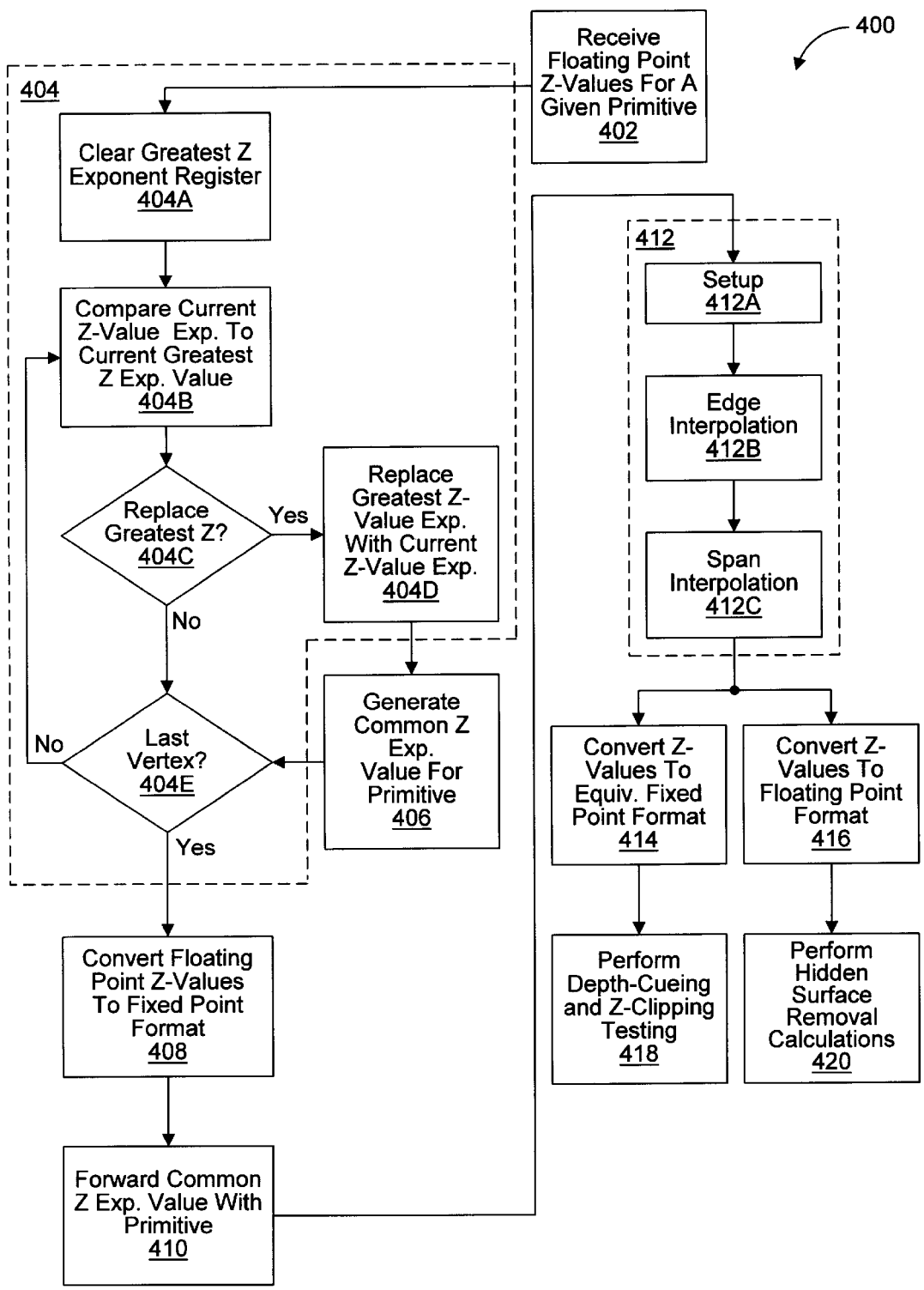
FIG. 8 is a flowchart depicting a method for handling Z-values in the processing pipeline of a graphics system according to one embodiment of the present invention.

Referring now to FIG. 8, a flowchart of a method 400 for handling Z-values in a graphics processing pipeline is depicted. Z-values are part of the graphics data transferred by system CPU 102 to graphics accelerator 112 over system bus 104. These Z-values represent Z coordinates for vertices of triangle primitives usable to render three-dimensional objects on display device 84. The transferred Z-values are model space coordinates and are represented in a first floating point format 500, such as the IEEE floating point standard shown in FIG. 9A. As shown, IEEE format 500 includes a sign bit 502, an exponent portion 504, and a mantissa portion 506, which includes a "hidden one" location 508. Other floating point formats may also be used.

The model space coordinates received by graphics accelerator 112 are transformed into homogeneous clipping coordinates and normalized within F-core block 202, such that the Z-values are then represented as Z/W. These values exist in the −1 to 1 range. After clipping, the Z-values (along with X and Y coordinates) for a given primitive are mapped to screen space through a transform operation in step 402 of method 400. The X and Y coordinates of screen space correspond to pixel values on display device 84, while the Z coordinates correspond to depth along an imaginary z-axis perpendicular to the screen. As disclosed in the parent patent application, after this operation, Z-values are preferably represented as $W_f/W$, where $W_f$ represents W at the front clipping plane. As described above, Z-values transformed in this manner range between 1.0 (inclusive) at the front clipping plane and 0.0 (exclusive) as objects approach the back clipping plane. In contrast to prior art systems, this transformation does not result in significant accuracy loss for numbers near zero (which are near the back clipping plane according to one embodiment of the present invention). Note that the Z-values are still represented in floating point format 500 subsequent to step 402.

Next, in steps 404 and 406, the Z-value for the given primitive with the greatest exponent portion 504 value is determined, and a common Z exponent is generated for the primitive. As described above, the use of a floating point Z-buffer has the potential disadvantage of being more costly to implement due to the additional bits of representation. This drawback is lessened in large part within the present invention by the use of a single exponent for each of the Z-values of a given primitive. This may be done since it is statistically likely that all vertices of a given primitive will have the same exponent for all Z-values (or that the exponents will be very close). Polygons which have exponents that are not closely related are typically due to poor graphical programming practice.

Figure 10:
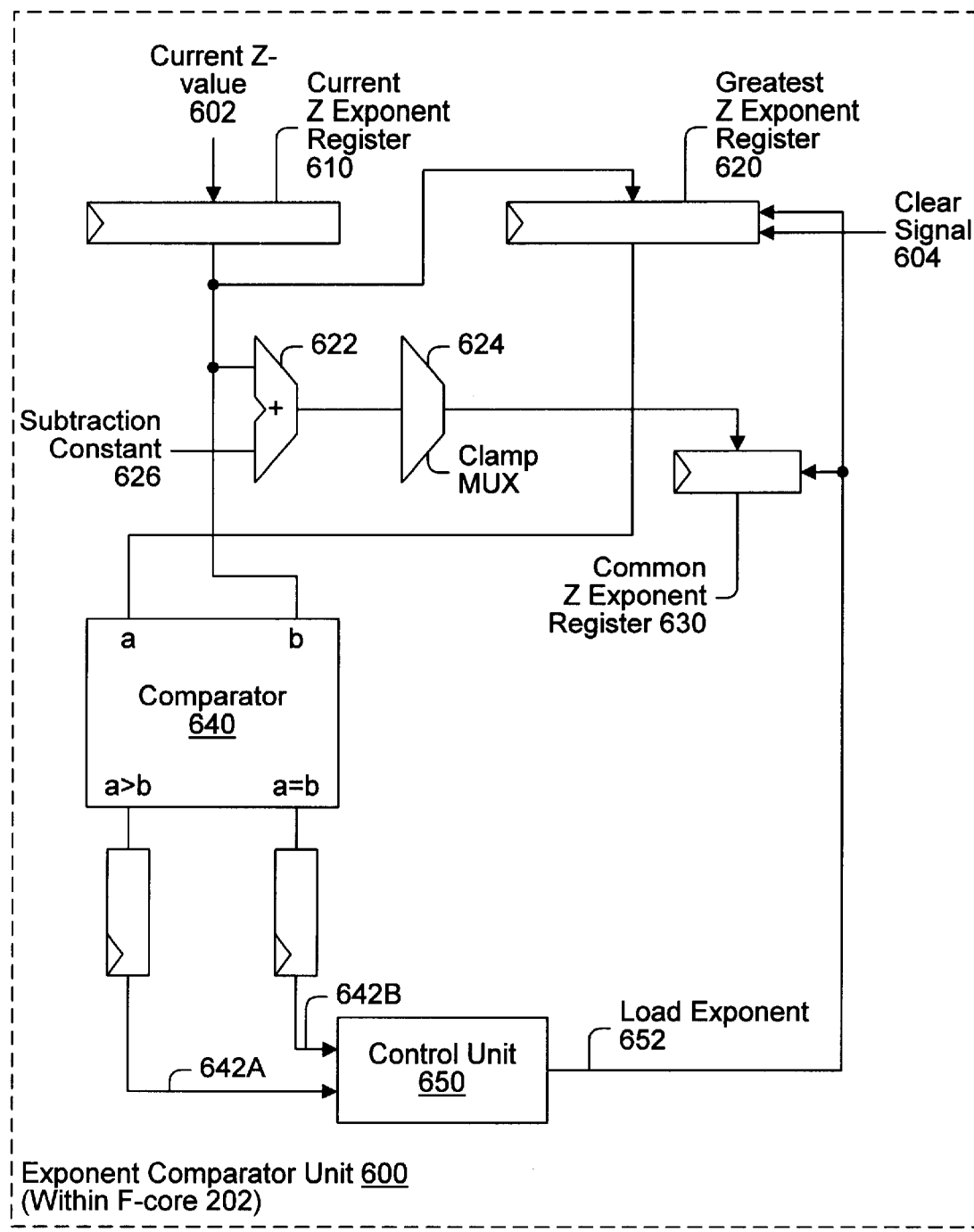
FIG. 10 is a block diagram illustrating an exponent comparator unit according to one embodiment of the present invention.

Step 404 includes several sub-steps, which are described with reference to FIGS. 8 and 10. FIG. 10 depicts an exponent comparator unit 600 within F-core block 202. Exponent comparator unit 600 includes a current Z exponent register 610 coupled to receive current Z-value 602. The output of register 610 is coupled to a greatest Z exponent register 620, an adder 622, and a comparator 640. Comparator 640 is also coupled to receive the output of register 620, and conveys compare signal 642A–B to a control unit 650. Control unit 650, in turn, conveys a load exponent signal 652 to a common Z exponent register 630, as well as register 620. Register 620 additionally receives a clear signal 604. Register 630 receives its input from a clamp multiplexer 624 coupled to the output of adder 622, which receives subtraction constant 626 as the other input.

In step 404A, greatest Z exponent register 620 is cleared by asserting clear signal 604. Because register 620 is designed to hold the current greatest Z exponent value for the current primitive, this register is cleared prior to receiving Z-values for the current primitive. In the preferred embodiment, this operation is performed by executing a "fix z" instruction with a particular state bit set.

Next, in step 404B, a current Z value 602 is received in register 610. The contents of registers 610 and 620 are forwarded to comparator 640 to determine if current Z value 602 is greater than the contents of register 620. Comparator 640 conveys compare signals 642 to control unit 650, which determines (in step 404C) whether the contents of 620 should be replaced by the contents of register 610. For the first Z-value received for a given primitive, the contents of register 620 are always replaced.

If replacement is necessary, the contents of current Z exponent register 610 are written to greatest Z exponent register 620 in step 404D. When the contents of register 610 are conveyed to comparator 640 to perform the compare operation in step 404B, the register 610 value is also conveyed (speculatively) to the input of register 620. If control unit 650 determines (based on compare signals 642) that replacement is needed, load exponent signal 652 is asserted, which causes the current value of register 610 to be copied to register 620. The current Z value thus becomes the current greatest exponent value. In the preferred embodiment, this operation is effectuated by the "fix gtz" instruction stored in SRAM 153 and executed by circuitry within F-core block 202.

Figure 9A:
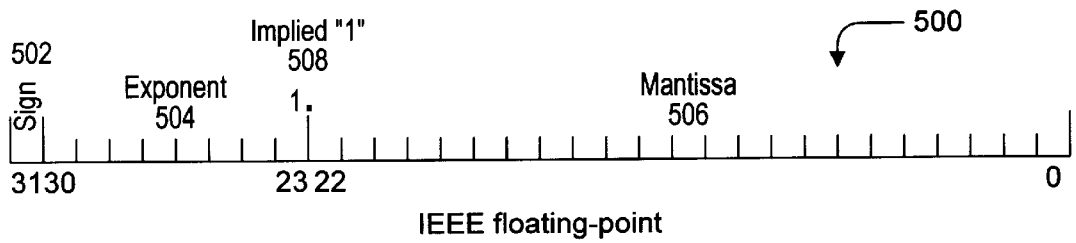
FIGS. 9A–9D depict various formats for Z-values utilized within a 3-D graphics accelerator according to one embodiment of the present invention.

A common Z exponent value is calculated concurrently with the replacement operation in step 406. While the common Z exponent value (stored in register 630) is related to the contents of register 620, a lesser number of bits of representation are used. For example, as shown in FIG. 9A, exponent portion 504 of IEEE format 500 has 8 bits. While this number of bits is needed to represent the entire floating point range, a lesser number of bits may be used to represent numbers between 0 and 1. This further conserves the amount of space used to represent Z-values.

In the preferred embodiment of the present invention, 4 bits are used to encode the common Z exponent value, allowing values between 0 and 15. This allows for 15 normalized and 1 de-normalized representations. A common Z exponent value of 15 corresponds to the maximum exponent 504 value for a number less than 1.0, which for format 500 is 126. Converting from a current Z-value (e.g., value 602) to the 4-bit representation thus involves subtracting a constant value. In the preferred embodiment, this is achieved by subtracting 111 (or, alternatively, adding −111).

Each time a compare is performed in step 404B, the value in register 610 is conveyed to adder 622, which also receives subtraction constant 626. In the preferred embodiment of the invention, this constant is equal to 0×91 (−111 in decimal). The output of adder 622 is then conveyed to clamp mux 624. If the output of adder 622 produces a negative result, clamp mux 624 clamps the results to zero. Otherwise, the output of adder 622 is unaffected. In both cases, the output of clamp mux 624 is conveyed to the input of common Z exponent register 630. The output of mux 624 is not written to register 630 unless a replacement is performed (indicated by load exponent signal 652 being asserted). If a replacement operation is performed in step 404D, then, a corresponding common Z exponent value is stored in register 630 in step 406.

As shown by decision box 404E, the above-described steps are executed for the remaining vertices of the primitive (two more times, in the typical case of a triangle primitive). After the last Z-value has been compared (and potentially written into register 620), register 620 holds the maximum value of exponent portion 504 for the Z-values of the current primitive. Similarly, register 630 stores the common Z exponent value that corresponds to the value in register 620.

Figure 9B:
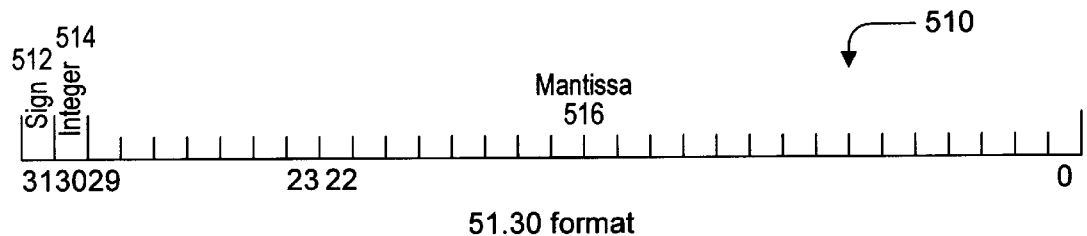

In step 408, the Z-values for the given primitive are converted into a fixed point format, such as format 510 shown in FIG. 9B. As shown, format 510 includes a sign bit 512, an integer bit 514, and a mantissa portion 516. This is referred to a s1.30 format (a sign bit, one integer bit, and 30 fractional bits). There is no exponent portion in fixed point format 510 as mantissa portion 516 is scaled to the common Z exponent value calculated in step 406. In the preferred embodiment, each Z-value is normalized within F-core block 202 by a code sequence implementing the following algorithm:

```
//Normalize a bus values with greatest Z value from fadd_gtz
shift = greatest_z_exponent - abus exponent;
mantissa |= 0x800000; // or in implied 1 bit to mantissa
if(abus_exponent>greatest_z_exponent){
        output = 0x0ffffff;
}else{
        mantissa = mantissa <<6;
        output = mantissa >>shift;
}.
```

As shown, the algorithm takes the difference of the exponent portion 504 of both the greatest Z exponent and the current Z exponent. This value is stored in the variable "shift". The hidden one bit is then OR'd into the floating point mantissa value, creating 24 bits worth of mantissa. This 24-bit value is then left-shifted 6 bits (which pads the remainder of the 30-bit mantissa field 516 with zeroes). Note that these extra 6 bits provide additional accuracy for subsequent fixed point processing. Finally, the 30-bit value is right-shifted by the appropriate number of bits so that mantissa value 516 is normalized to the common Z exponent for the primitive. Note that in other embodiments, the float-to-fixed conversion process may be performed differently, including with dedicated hardware circuitry.

Figure 11:
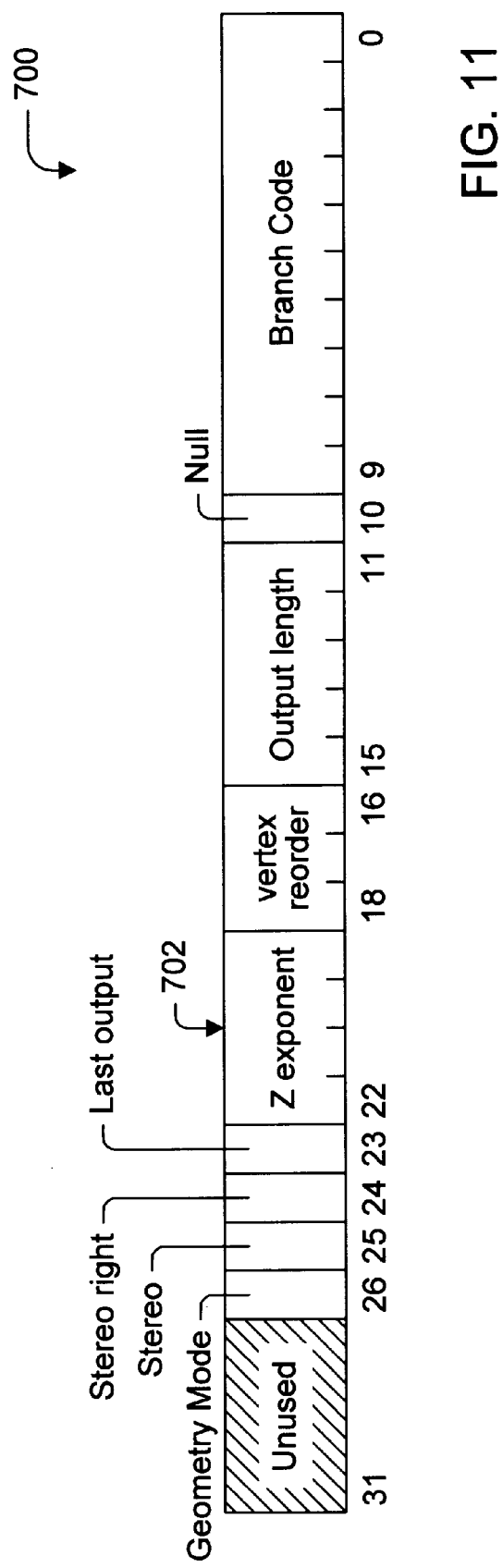
FIG. 11 illustrates a header word used for storing a common Z exponent value according to one embodiment of the present invention.

With the Z-values converted to fixed point in step 408, the common Z exponent value is forwarded with the primitive for further processing in step 410. As shown in FIG. 11, the common Z exponent value is stored into Z exponent field 702 within header word 700. Header word 700 is written by F-core block 202, and conveyed to S-core block 206 via the FS-buffer shown in FIG. 6. As the corresponding primitives is operated upon, header word 700 propagates through the pipeline. The Z exponent value in field 702 is therefore available for calculations such as those described below.

After the common Z exponent is generated and forwarded with the primitive, fixed point processing is performed on the primitive in step 412. As shown in FIG. 8, step 412 includes sub-steps 412A (setup), 412B (edge walking), and 412C (span filling). These operations are performed as described above. In the preferred embodiment, setup is performed within S-core block 206 of processors 152, edge interpolation is performed within edge walker unit 322 within draw processors 172, and span interpolation is performed within span fill unit 324 of draw processors 172. These steps are advantageously performed with greater accuracy using s1.30 format 510 shown in FIG. 9B. It is noted that in alternate embodiments, different operations than those presently shown may be performed within step 412.

Figure 12:
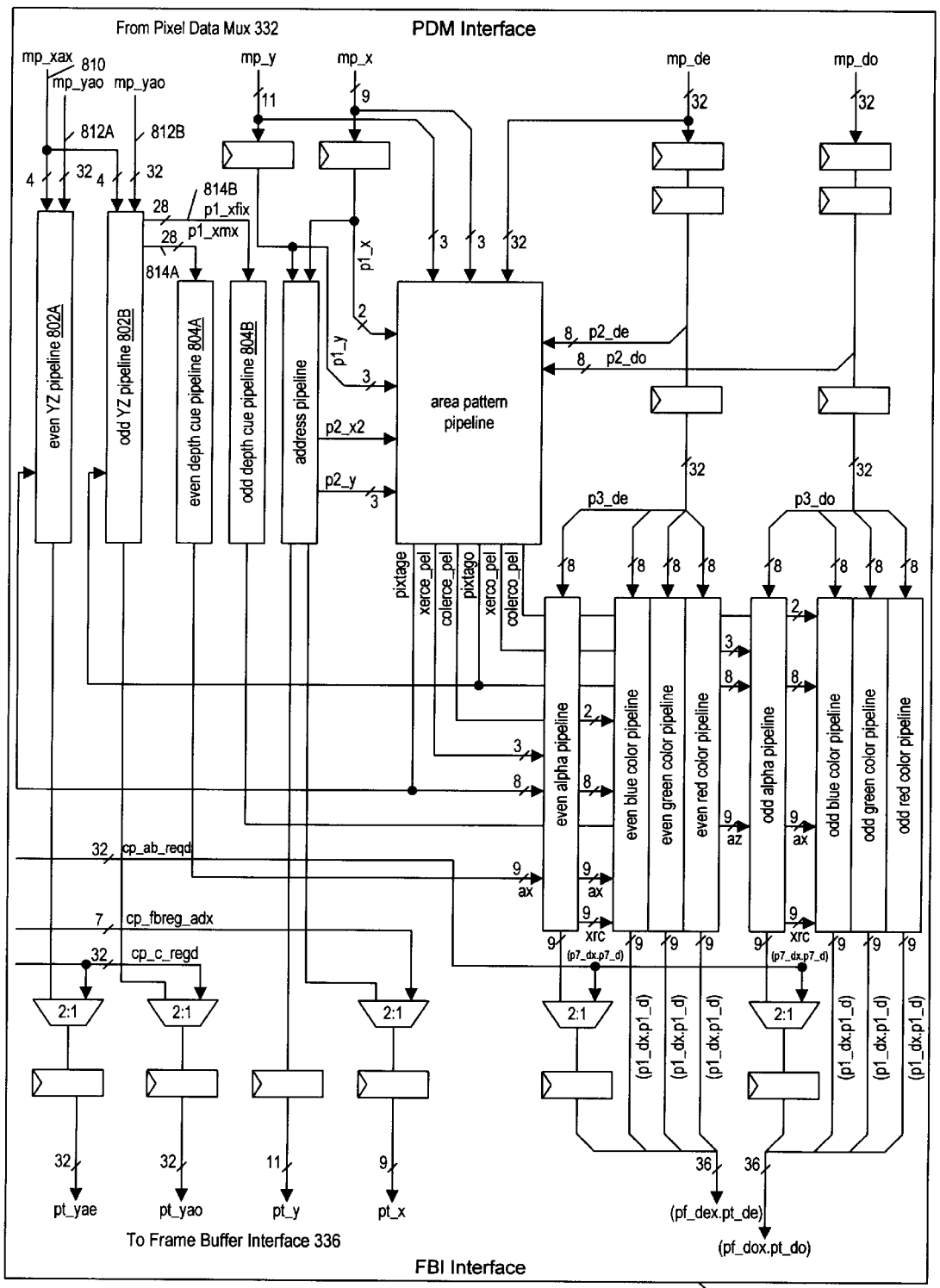
FIG. 12 is a block diagram of a pixel processor according to one embodiment of the present invention.

Referring now to FIG. 12, a block diagram of pixel processor 334 is shown. Subsequent to span interpolation in step 412C, primitive data is transferred to processor 334 for additional operations before being transferred to frame buffer 100 via frame buffer interface 336. As depicted, the common Z exponent value calculated as described above is conveyed to odd and even YZ pipelines 802A–B on bus 810. Similarly, the fixed point Z-values (in s1.30 format) are transferred to pipelines 802A–B on buses 812A and 812B, respectively. Note that while FIG. 12 depicts separate pipelines (odd and even) for pixel processing of Z-values, in alternate embodiments, the Z-values may be processed using a single pipeline. FIG. 12 also depicts depth cueing pipelines 804A–B, coupled to pipelines 802A and 802B by fixed point buses 814A and 814B, respectively.

Figure 9C:
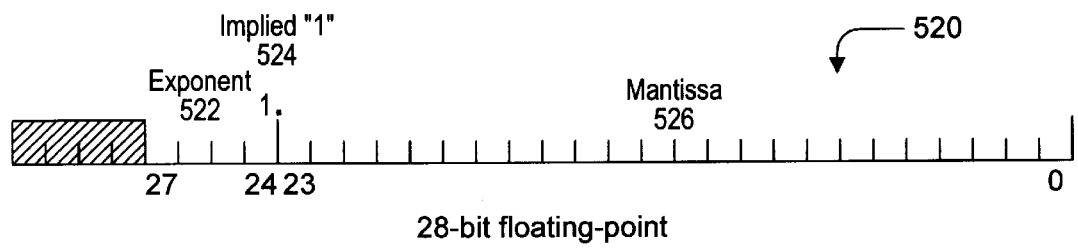
Figure 9D:
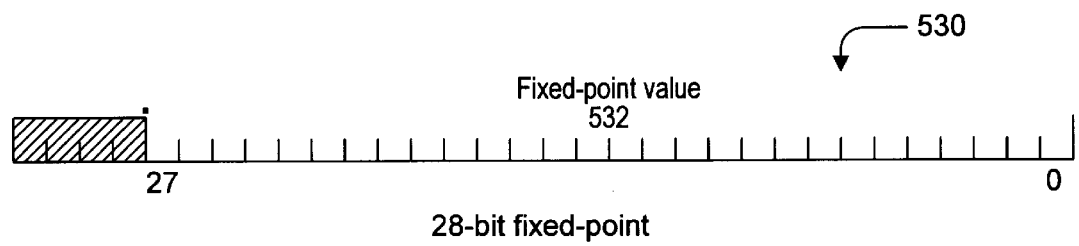

As will be described below, pipelines 802 perform two types of conversion on the s1.30 format data conveyed on buses 810 and 812. First, this data is converted to an equivalent fixed point, such as format 530 shown in FIG. 9D. This conversion corresponds to step 414 shown in FIG. 8. The fixed point data represented using format 530 is then used to perform depth-cueing and Z clip determination in step 418.

Secondly, pipeline 802 is configured to convert the incoming data to a floating point format if necessary before this data is transferred to frame buffer 100. This conversion process (step 416) is performed if the Z-values are selected to be represented in floating point notation within frame buffer 100. An example of such a representation is format 520 shown in FIG. 9C. It is assumed for the description of FIG. 13 below, cp_zf signal 916 is asserted, meaning floating point Z-values are desired. The Z-values resulting from the fixed-to-float conversion process of step 416 are then used to perform hidden surface removal operations within frame buffer 100 in step 420.

Figure 13:
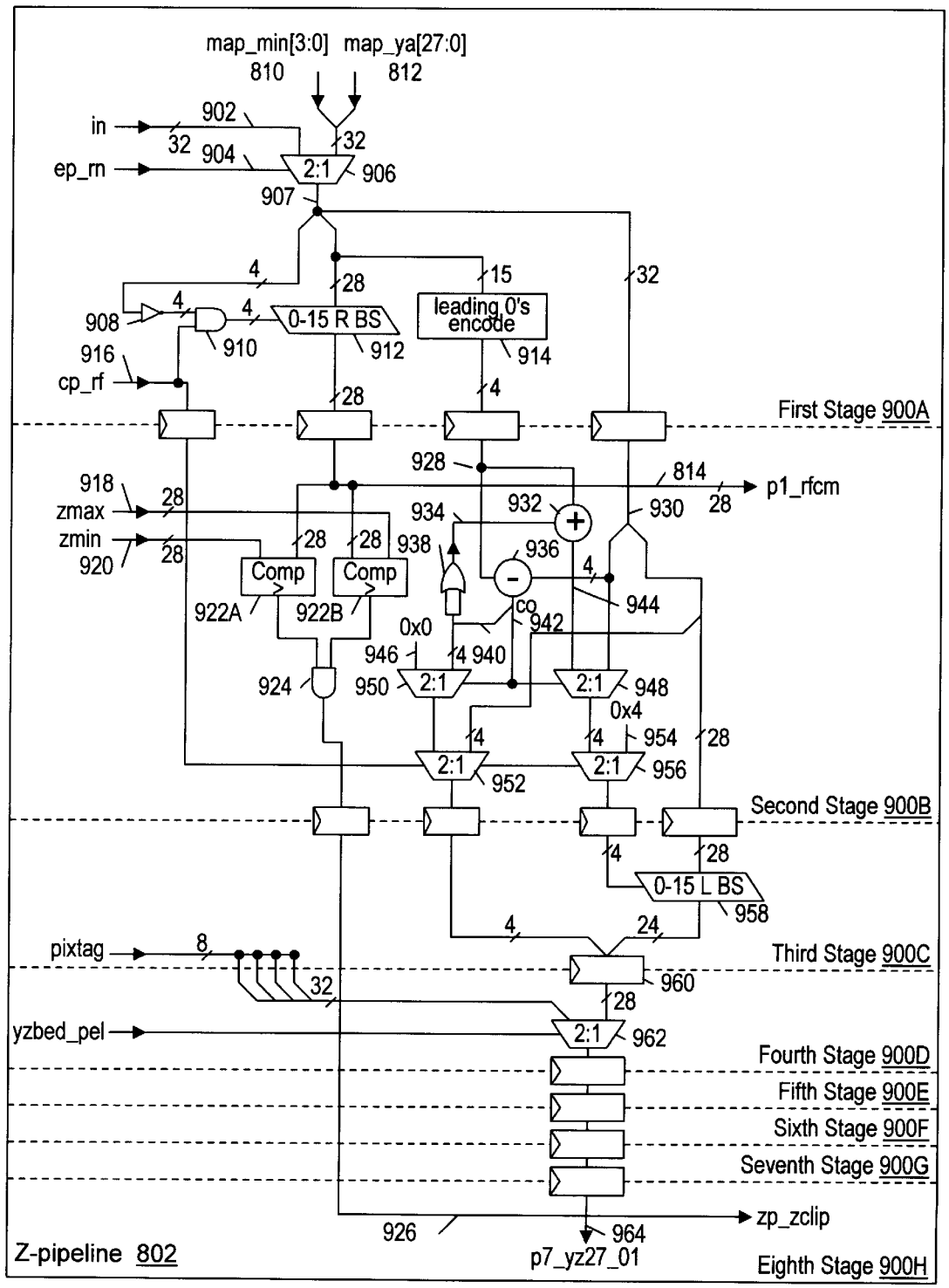
FIG. 13 is a block diagram of a pipeline configured to process Z pixel value according to one embodiment of the present invention.

Referring now to FIG. 13, a block diagram of pipeline 802 is depicted. Only the portion which processes Z pixel values is illustrated. Pipeline 802 is representative of pipelines 802A and 802B. In one embodiment, pipeline 802 is divided into stages 900A–H, although in alternate embodiments, pipeline 802 may be divided into more or less stages.

The first stage of Z pipeline 802, stage 900A, includes a multiplexer 906 configured to receive two sources of Z pixel data: a constant Z value 902 and the Z value from pixel data multiplexer 332, composed of a common Z exponent value on bus 810 and a fixed point Z value on bus 812. In method 400, multiplexer 906 forwards the data on buses 810/812 in response to a value on control signal 904. This data is conveyed on pixel output bus 907.

Pixel output bus 907 is coupled to both inverter 908 and barrel shifter 912. In step 414, these units, along with logic gate 910, convert the data on bus 907 to fixed point format 530. This step involves shifting mantissa portion 516 of format 510 by an amount equal to the complement of the common Z exponent value. Mantissa portion 532 of format 530 is thus not tied to an exponent value, unlike mantissa portion 516 of format 510, which corresponds to the common Z exponent value generated in step 406.

The most significant 4 bits of the data on bus 907 (the common Z exponent value) are conveyed to inverter 908. The inverted bits are then conveyed to logic gate 910, where they are qualified by control signal 916. The output of logic gate 910 is thus a shift count for the value of mantissa portion 516 provided to barrel shifter 912. For example, if the common Z exponent value is 15 (the maximum value), the shift count provided by inverter 908 is zero. No shift is consequently performed by shifter 912. Conversely, a common Z exponent value of 0 produces a shift count of 15.

Barrel shifter 912 produces a 28-bit fixed point mantissa portion 532 from the data conveyed from multiplexer 906. This data is latched at the first pipeline stage boundary for conveyance to Z clip testing hardware in the next clock cycle. The most significant mantissa bits on bus 907 are also conveyed to a leading zero encode unit 914. Unit 914 conveys the number of leading zeroes in the mantissa value on bus 907 to hardware in pipeline stage 900B.

In pipeline stage 900B, Z clip determination is performed, as well as the first part of converting the data on input bus 812 to a normalized floating point number. Z clip determination is performed by comparators 922 on data forwarded from previous pipeline stage 900A. Comparator 922A compares the Z pixel value, conveyed on pl_zfix bus 814 to zmin value 920. Similarly, comparator 922B compares the value on bus 814 to zmax value 918. If the Z pixel value is outside of either of these values, clipping should be performed in the Z direction. Logic gate 924 thus asserts its output, which is conveyed as zp_zclip signal 926 in subsequent pipeline stage 900C. Additionally, the fixed point value on bus 814 is conveyed to depth cueing pipelines 804 for further processing.

Floating point normalization for Z-buffer values also begins in pipeline stage 900B. In order to convert Z-values from format 510 to format 520, the most significant one bit value in mantissa portion 516 needs to be shifted to hidden one location 524. This process is begun by unit 914 counting the number of leading zeroes in mantissa portion 514 for a given Z-value.

Subtractor 936 is coupled to receive both this number of leading zeroes for the Z value on bus 928, as well as the common Z exponent value (the most significant 4 bits of bus 930). Subtractor 936 is configured to subtract the leading number of zeroes from the common exponent value, and convey the result on difference bus 940. If this result is non-negative, the value of mantissa portion 516 should be shifted by an amount equal to one plus the number of leading zeroes in order to generate the value of mantissa portion 526 (which is normalized). If the result is negative (the number of leading zeroes is greater than the common Z exponent), this indicates that the value of mantissa portion 516 conveyed on bus 907 should only be shifted by common Z exponent value (this, however, results in a de-normalized number).

Subtractor 936 accordingly conveys two outputs, difference bus 940 (the result of the subtraction), and carryout signal 942 (asserted if difference bus 940 is negative). Difference bus 940 is conveyed to logic gate 938. Logic gate 938 conveys an asserted signal 934 to adder 932 if difference bus 940 is non-zero. Adder 932 also receives the number of leading zeroes on bus 928. If bus 940 is non-zero, adder 932 conveys one plus the number of leading zeroes to multiplexer 948. The other input of multiplexer 948 receives the common Z exponent value from bus 930.

The output of multiplexer 948 (the shift count) is thus selected based on the value of carryout signal 942. If the number of leading zeroes exceeds the common Z exponent value, the common Z exponent value is passed to multiplexer 956; otherwise, the value on bus 944 is conveyed. Multiplexer 956 conveys the selected one of these two value to pipeline stage 900C. Note that if signal 916 is not asserted, the shift count conveyed to stage 900C is four (which has the effect of passing through the value on bus 907 unmodified since these four "lost" bits are re-concatenated as described below).

Multiplexer 950 is used to select which value is conveyed to multiplexer 952 for the four most significant bits of the Z-value being processed by pipeline 802. If floating point mode is selected for Z-values (signal 916 is on), these four bits form the value of floating point exponent portion 522 shown in FIG. 9C. If floating point mode is not selected, these four bits are the most significant mantissa bits in mantissa portion 532 shown in FIG. 9D. The value selected by multiplexer 950 is also dependent upon the value of carryout signal 942. If carryout signal 942 is active, zero constant 946 is conveyed to multiplexer 952. This has the result of setting the exponent value to zero. If carryout signal 942 is inactive, however, the difference value 940 computed by subtractor 936 is conveyed as the value of exponent portion 522.

The value conveyed from multiplexer 950 is forwarded to pipeline stage 900C through multiplexer 952. In pipeline stage 900C, the output of multiplexer 952 becomes the four most significant bits of the Z-value. As described above, these four bits form the exponent value 522 if the Z-values are to be represented in floating point format 520. Pipeline stage 900C also completes the normalization of Z-values being converted to floating point format 520. This is accomplished by barrel shifter 958 left shifting the mantissa value of bus 930, producing a value of mantissa portion 526. This mantissa value is concatenated with the exponent value in register 960. It is noted that fixed point Z-values (signal 916 inactive) are conveyed to register 960 without modification.

In pipeline stage 900D, multiplexer 962 chooses between the Z-value conveyed from stage 900C and a pixel value conveyed from a different pipeline. Stages 900E–G are present in order to match other datapath pipelines in pixel processor 334. In stage 900H, a floating point Z-value is conveyed on bus 964. In the preferred embodiment, this value (which may be normalized or de-normalized) is represented in floating point format 520. This value is conveyed to frame buffer interface 336 and on to frame buffer 100, for hidden surface removal operations. A simple integer compare is sufficient for the Z-buffer comparison, since the floating point format used in the preferred embodiment of the present invention results in a uniform, monotonically decreasing distribution of numbers from front to back.

Utilization of method 400 advantageously allows a more efficient handling of Z-values. By converting transformed Z-values to a fixed point format (such as 510), the same hardware that processes color and alpha values within the graphics pipeline may be re-used. Additional efficiency is achieved by representing an entire primitive with a single Z value until the pixel processing stage of the pipeline. In one embodiment, the fixed point format used as an intermediate representation (i.e., format 520), may be converted into an equivalent fixed point format for operations such as Z clip testing and depth-cueing.

Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A system for rendering 3D graphics data, said system comprising:

an input unit coupled to receive a first set of z coordinate values corresponding to a first graphics primitive, wherein said first set of z coordinate values are represented in a first floating point format;

a float-to-fixed conversion unit coupled to receive said first set of z coordinate values from said input unit, wherein said float-to-fixed conversion unit is configured to convert said first set of z coordinate values to a fixed point format;

a first graphics processing unit coupled to receive a representation of said first set of z coordinate values in said fixed point format, wherein said first graphics processing unit is configured to perform a first set of graphics operations using said first set of z coordinate values represented in said fixed point format, wherein performing said first set of graphics operations generates a second set of z coordinate values;

a fixed-to-float conversion unit coupled to receive said second set of coordinate values from said first graphics processing unit, wherein said float-to-fixed conversion unit is configured to convert said second set of z coordinate values to a second floating point format;

a second graphics processing unit coupled to receive said second set of z coordinate values represented in said second floating point format, wherein said second graphics processing unit is configured to perform a second set of graphics operations using said second set of z coordinate values represented in said second floating point format, wherein said second floating point format is different than said first floating point format; and a buffer configured to store and output color information generated by said system based on said 3D graphics data, wherein said color information is usable to generate an image.

2. The system of claim 1, wherein values represented in said first floating point format include mantissa and exponent portions.

3. The system of claim 2, wherein said float-to-fixed conversion unit is configured to generate a common z exponent value for said first set of z coordinate values.

4. The system of claim 3, wherein said float-to-fixed conversion unit is configured to determine a greatest z coordinate value of said first set of z coordinate values, and wherein said float-to-fixed conversion unit is further configured to generate said common z exponent value from said greatest z coordinate value.

5. The system of claim 3, wherein said first graphics processing unit is configured to utilize said common z exponent value in performing said first set of graphics operations.

6. The system of claim 3, wherein said float-to-fixed conversion unit is configured to scale said first set of z coordinate values according to said common z exponent value.

7. The system of claim 6, wherein said first graphics processing unit is configured to utilize said scaled first set of z coordinate values in performing said first set of graphics operations.

8. The system of claim 1, wherein said first set of z coordinate values are greater than 0.0 and less than or equal to 1.0, wherein a z value of 1.0 for a given vertex indicates said given vertex is at a front z clipping plane, and wherein a z value approaching 0.0 for said given vertex indicates that said given vertex is approaching a back z clipping plane.

9. The system of claim 1, wherein said first graphics processing unit is configured to perform setup operations for said first geometric primitive.

10. The system of claim 1, wherein said first graphics processing unit is configured to perform edge interpolation of said first geometric primitive.

11. The system of claim 1, wherein said first graphics processing unit is configured to perform span interpolation of said first geometric primitive.

12. The system of claim 1, wherein values represented in said fixed point format include mantissa portions.

13. The system of claim 12, wherein said fixed-to-float conversion unit is configured to normalize mantissa portions of each of said second set of z coordinate values represented in said fixed point format, wherein said fixed-to-float conversion unit is configured to utilize said common z exponent value in order to generate a mantissa portion and an exponent portion of said second floating point format.

14. The system of claim 1, wherein said second graphics processing unit is configured to perform Z-buffer comparisons to effectuate hidden surface removal.

15. The system of claim 1, further comprising a control unit configured to enable a floating point Z-buffer mode, wherein said fixed-to-float conversion unit is configured to converting said second set of z coordinate values to said second floating point format in response to said floating point Z-buffer mode being enabled, and wherein said second graphics processing unit is configured to perform said second set of graphics operations in response to said floating point Z-buffer mode being enabled.

16. A system for processing a first set of z coordinate values, wherein said first set of z coordinate values correspond to vertices of a first geometric primitive, said system comprising:

receiving means for receiving said first set of z coordinate values, wherein said first set of z coordinate values are represented in a first floating point format;

first converting means for converting said first set of z coordinate values to a fixed point format;

first graphics processing means for performing a first set of graphics operations using said first set of z coordinate values represented in said fixed point format, wherein said performing said first set of graphics operations generates a second set of z coordinate values represented in said fixed point format;

second converting means for converting said second set of z coordinate values to a second floating point format;

second graphics processing means for performing a second set of graphics operations using said second set of z coordinate values represented in said second floating point format, wherein said second floating point format is different than said first floating point format; and a buffer configured to store and output pixels generated by said system based on said first geometric primitive and z coordinate values, wherein said pixels are usable to generate an image.

17. A method for rendering a set of three-dimensional graphics data, the method comprising:

receiving the set of three-dimensional graphics data, wherein the set of three-dimensional graphics data represents at least one primitive, wherein each primitive comprises a plurality of vertices, wherein each of the vertices comprises a z-value in a first floating point format;

determining which of the plurality of vertices for each primitive has a largest z-value exponent;

converting the z-values for each primitive to a fixed point format, wherein the fixed point format comprises a common z-value exponent for each primitive, wherein said common z-value exponent is based on the largest z-value exponent; processing the plurality of vertices in the fixed point format;

converting the processed plurality of vertices to a second floating point format, wherein said second floating point format differs from said first floating point format;

performing hidden surface removal on the plurality of vertices; and generating one or more pixels based on the plurality of vertices, wherein the one or more pixels are displayable to form an image.

18. The method as recited in claim 17, wherein said fixed point format varies between 1.0 at a front clipping plane and 0.0 at a back clipping plane.

19. The method as recited in claim 17, wherein said processing comprises: setting up the primitive.

20. The method as recited in claim 17, wherein said processing comprises: performing edge interpolation on the primitive.

21. The method as recited in claim 17, wherein said processing comprises: performing span interpolation on the primitive.

22. The method as recited in claim 17, wherein said performing hidden surface removal comprises: performing depth-cueing; and performing z-clipping.

23. The method as recited in claim 17, wherein said common z-value exponent is limited to a predetermined number of bits, wherein said predetermined number of bits is approximately 4 bits.

24. The method as recited in claim 17, wherein said common z-value exponent is limited to a range that is approximately between 0 and 15.

25. The method as recited in claim 17, wherein said common z-value exponent is calculated by subtracting a predetermined constant from the largest z-value exponent.

26. The method as recited in claim 25, wherein said predetermined constant comprises 111.

27. The method as recited in claim 17, wherein said fixed point format supports a plurality of normalized representations and a single denormalized representation.

28. The method as recited in claim 17, wherein said fixed point format is a s1.30 format.

* * * * *